(12) United States Patent
Kudo et al.

(10) Patent No.: US 12,170,547 B2
(45) Date of Patent: Dec. 17, 2024

(54) TERMINAL AND COMMUNICATION SYSTEM

(71) Applicant: NIPPON TELEGRAPH AND TELEPHONE CORPORATION, Tokyo (JP)

(72) Inventors: Riichi Kudo, Musashino (JP); Takeru Inoue, Musashino (JP); Atsushi Taniguchi, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 385 days.

(21) Appl. No.: 17/604,187

(22) PCT Filed: Apr. 26, 2019

(86) PCT No.: PCT/JP2019/017948
§ 371 (c)(1),
(2) Date: Oct. 15, 2021

(87) PCT Pub. No.: WO2020/217460
PCT Pub. Date: Oct. 29, 2020

(65) Prior Publication Data
US 2022/0190941 A1    Jun. 16, 2022

(51) Int. Cl.
*H04B 17/00*         (2015.01)
*G08B 21/18*         (2006.01)
(Continued)

(52) U.S. Cl.
CPC ......... *H04B 17/373* (2015.01); *G08B 21/182* (2013.01); *H04Q 9/00* (2013.01)

(58) Field of Classification Search
None
See application file for complete search history.

(56) References Cited

U.S. PATENT DOCUMENTS

2018/0231982 A1    8/2018  Yunoki et al.
2019/0253948 A1*   8/2019  Nagura ............. H04W 36/0088
(Continued)

FOREIGN PATENT DOCUMENTS

| JP | 2017-34635 A | 2/2017 |
| JP | 2018-32939 A | 3/2018 |
| WO | WO-2017/077621 A1 | 5/2017 |

OTHER PUBLICATIONS

IEEE Std 802.11 ac (TM)-2013, IEEE Standard for Information Technology—Telecommunications and Information Exchange Between Systems Local and Metropolitan Area Networks—Specific requirements, Part 11: Wireless LAN Medium Access Control (MAC) and Physical Layer (PHY) Specifications, Dec. 2016.
(Continued)

*Primary Examiner* — Abdelillah Elmejjarmi

(57) ABSTRACT

Quality of communication between a terminal and an external communication device in response to control of the terminal is predicted by acquiring surrounding environment information or/and terminal information of the terminal, and the terminal is controlled to improve the communication quality, avoid fatal communication quality degradation, or satisfy a control condition of the terminal for the communication quality, thereby realizing control that satisfies a predefined required condition related to communication.

10 Claims, 13 Drawing Sheets

(51) Int. Cl.
*H04B 17/373* (2015.01)
*H04Q 9/00* (2006.01)

(56) References Cited

U.S. PATENT DOCUMENTS

2020/0053591 A1* 2/2020 Prasad .............. H04W 28/0268
2021/0266715 A1* 8/2021 Uchiyama ............. H04W 16/28

OTHER PUBLICATIONS

Ghosh, Amitava, et al. "Millimeter-wave Enhanced Local Area Systems: A high-data-rate Approach for Future Wireless Networks." IEEE Journal on Selected Areas in Communications 32.6 (2014): 1152-1163.

* cited by examiner

| COMMUNICATION QUALITY | CONTROL RULE |
|---|---|
| COMMUNICATION DISCONNECTION OF EQUAL TO OR LESS THAN 0.2 Mbps OR DELAY IS GREATER THAN 5 SECONDS | EQUAL TO OR LESS THAN 5 km/h AND STOP AT ROAD SHOULDER |
| EQUAL TO OR GRAETER THAN 0.2 Mbps AND EQUAL TO OR LESS THAN 2 Mbps AND DELAY OF EQUAL TO OR LESS THAN 5 SECONDS | EQUAL TO OR LESS THAN 10 km/h AND EVACUATION TO SAFETY AREA OF NON-EXPRESSWAY ROAD |
| EQUAL TO OR GREATER THAN 2 Mbps AND EQUAL TO OR LESS THAN 10 Mbps AND DELAY OF EQUAL TO OR LESS THAN 1 SECOND | EQUAL TO OR LESS THAN 40 km/h AND RECOMMENDATION OF NOTIFICATION TO SURROUNDING VEHICLES |
| EQUAL TO OR GREATER THAN 10 Mbps AND EQUAL TO OR LESS THAN 50 Mbps | NO LIMITATION ON PERMITTED ROAD |
| EQUAL TO OR GREATER THAN 50 Mbps | NO LIMITATION |

Fig. 4

TERMINAL AND COMMUNICATION SYSTEM

CROSS-REFERENCE TO RELATED APPLICATIONS

This application is a 371 U.S. National Phase of International Application No. PCT/JP2019/017948 filed on Apr. 26, 2019. The entire disclosure of the above application is incorporated herein by reference.

TECHNICAL FIELD

The present disclosure relates to control of a system using communication and a terminal using communication.

BACKGROUND ART

Internet of things (IoT) in which various devices are connected to the Internet has been increasingly realized, and wireless connection of various devices such as vehicles, drones, and construction machinery vehicles is in progress. Supporting wireless standards such as a wireless local area network (LAN) defined by standard specification IEEE802.11 as a wireless communication standard, Bluetooth (registered trademark), LTE or 5G cellular communication, low power wide area (LPWA) communication for IoT, an electronic toll collection system (ETC) used for vehicle communication, Vehicle Information and Communication System (VICS) (registered trademark), and ARIB-STD-T109 have been developed, and are expected to be spread in the future.

Wireless communication has been used for various applications, but wireless communication does not always meet required conditions for communication quality depending on services, which is problematic. For example, since high frequencies in a millimeter band are used for IEEE 802.11ad and 5G of cellular communication, blocking due to shielding objects between transmission and reception in wireless communication causes a serious problem. Blocking affects communication quality of other types of communication as well. Blocking due to shielding objects and changes in propagation environments due to motion of reflecting objects affect communication quality of wireless communication not only at frequencies in a millimeter wave band but also at other frequencies. In addition, it is also known that Doppler shift caused by movement of a reflecting object affects communication.

On the other hand, communication and control are becoming more deeply related. In a case in which machines that can be remotely operated with high precision at high speeds are controlled, such as unattended automatic traveling systems, drone control, and robot control, the devices of which are remotely managed, for example, high communication quality is required. Although there are not yet definite rules, in a case in which a speed limit is provided in accordance with communication quality, for example, an improvement in communication quality directly leads to efficiency of machine control. Not only optimization of machine control as in the related art but also control with optimized communication quality are required.

CITATION LIST

Non Patent Literature

Non Patent Literature 1: IEEE Std 802.11ac (TM)-2013, IEEE Standard for Information technology-Telecommunications and Information Exchange Between Systems Local and Metropolitan Area Networks-Specific requirements, Part 11: Wireless LAN Medium Access Control (MAC) and Physical Layer (PHY) Specifications, December 2013 Non Patent Literature 2: Ghosh, Amitava, et al. "Millimeter-wave Enhanced Local Area Systems: A High-data-rate Approach for Future Wireless Networks." IEEE Journal on Selected Areas in Communications 32.6 (2014): 1152-1163

SUMMARY OF THE INVENTION

Technical Problem

In a case in which wireless communication functions are mounted in vehicles, drones, construction machinery vehicles, robots, and other devices and there are required conditions in relation to throughputs, delays, continuity, stability, and other aspects of communication quality for the communication thereof, there is a problem that communication quality due to changes in surrounding environment significantly affects services and systems provided by the devices.

Thus, in view of the aforementioned circumstances, an object of the present disclosure is to provide a communication system and terminal capable of addressing variations in communication quality.

Means for Solving the Problem

A communication system according to the present disclosure is adapted such that a device provided with a wireless communication function predicts future communication quality using surrounding environment information including information obtained by a camera, a sensor, or other devices that acquire surrounding environment and position information of surrounding objects provided as a notification through communication and determines control or control rules for the device itself in accordance with the future communication quality.

A communication system according to the present disclosure includes: a terminal according to the present disclosure; and an external communication device that communicates with the terminal.

The terminal according to the present disclosure is a terminal that communicates with an external communication device, the terminal including: a terminal management unit that generates terminal information including position information of the terminal itself; a surrounding environment information collection unit that collects surrounding environment information that is information related to a surrounding environment of the terminal itself; a communication unit that communicates with the external communication device; a communication prediction unit that predicts communication quality of the communication unit using the terminal information and the surrounding environment information; and a terminal control unit that controls the terminal itself based on the communication quality predicted by the communication prediction unit.

In the present disclosure, the communication prediction unit may output communication quality of the communication unit through machine learning from the surrounding environment information and the terminal information using an input and output relationship between information including the surrounding environment information and the terminal information and the communication quality of the communication unit, which are learned in advance.

In the present disclosure, the terminal may further include: a control table indicating control rules for the terminal that are able to be employed in advance for a plurality of states of communication quality, and the terminal control unit may call a control rule corresponding to the predicted communication quality from the control table and control the terminal based on the newly called control rule.

In the present disclosure, as the control rules, control parameters of a component of the terminal including at least any of a maximum moving speed of the terminal, a maximum rotation speed of the terminal, a movable route of the terminal, a movable area of the terminal, a route change of the terminal, and an operation range, a maximum moving speed, a maximum rotation speed, and a maximum torque of the component of the terminal may be set for the states of the communication quality.

In the present disclosure, the communication prediction unit may output quality of communication with the external communication device or control information of the terminal corresponding to communication quality to the terminal control unit through machine learning from the surrounding environment information and the terminal information using an input and output relationship between information including the surrounding environment information and the terminal information and the communication quality, also between information including the surrounding environment information and the terminal information and a terminal control method, which are learned in advance.

In the present disclosure, the terminal may further include: a communication evaluation unit that evaluates the communication quality of the communication unit, the communication prediction unit may use an evaluation result of the control of the terminal obtained by the communication evaluation unit with the result included in training data, and control information for improving the evaluation result of the communication quality through reinforcement learning or for causing the evaluation result to satisfy a predefined condition may be output to the terminal control unit.

In the present disclosure, the communication prediction unit may detect a communication quality degradation event due to which degradation of communication quality is predicted, using the surrounding environment information and the terminal information, and if the communication quality degradation event is input, the terminal control unit may control at least any of a motion, a speed, acceleration, an orientation, a position and power consumption of the terminal and a motion, a speed, acceleration, an orientation, and a position of a component under control of the terminal to alleviate communication quality degradation determined by the communication prediction unit.

In the present disclosure, the communication system may further include: an external operator that is connected to the terminal via a communication network and generates the control information of the terminal, the communication prediction unit may use the control information as an input signal via the communication unit, and in a case in which the communication quality of the communication unit output from the communication prediction unit does not satisfy a condition of communication quality defined for predefined control information, the communication prediction unit may generate a warning signal and output the warning signal to the external operator.

In the present disclosure, the communication system may further include: an external operator that is connected to the terminal via a communication network and generates the control information of the terminal, the communication prediction unit may use the control information as an input signal via the communication unit, and in a case in which the communication quality of the communication unit output from the communication prediction unit does not satisfy a condition of communication quality defined for predefined control information, alternative control information with a condition that satisfies predicted the communication quality may be newly generated, and the control information input from the external operator may be discarded.

Note that the aforementioned disclosures can be combined as long as the combinations are possible.

Effects of the Invention

According to the present disclosure, it is possible to select physical control rules for the terminal corresponding to communication quality, to perform physical control of the terminal to improve the communication quality, and thereby to improve communication quality through prior prediction of degradation of wireless communication quality.

BRIEF DESCRIPTION OF DRAWINGS

FIG. 4 is an example of a control rule for communication quality.

DESCRIPTION OF EMBODIMENTS

Figure 1:
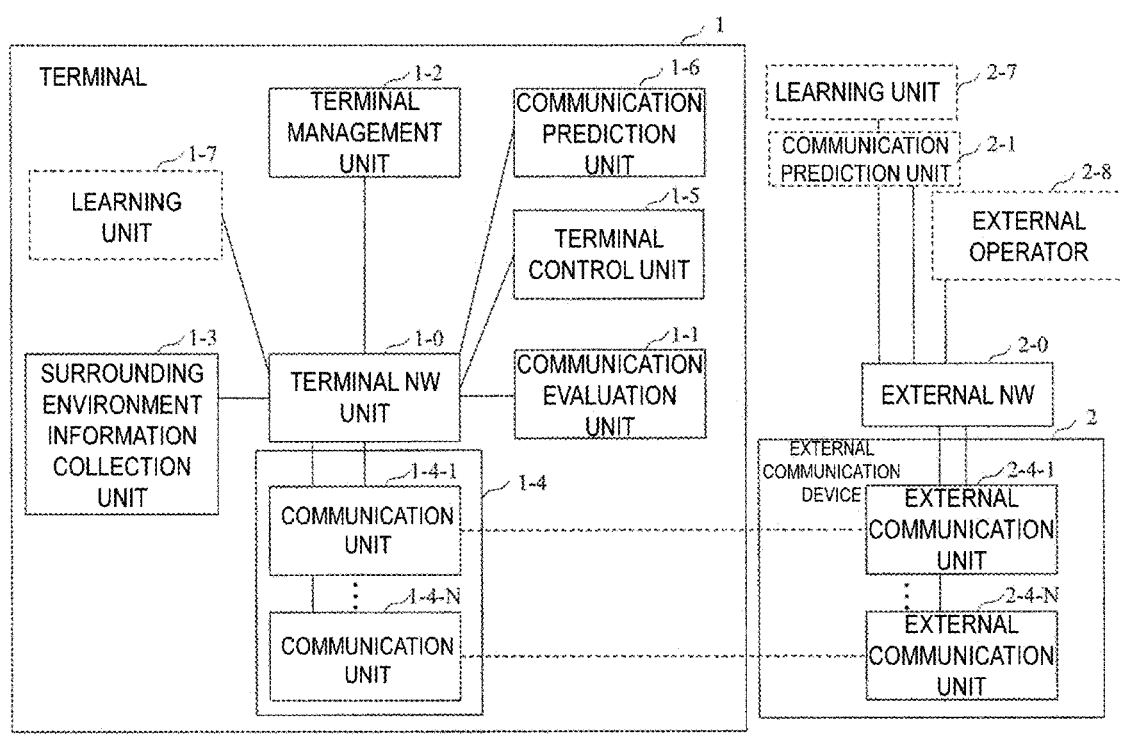
FIG. 1 is a block diagram illustrating a configuration example of a communication system according to the present disclosure.

Hereinafter, embodiments of the present disclosure will be described in detail with reference to the drawings. Note that the present disclosure is not limited to the embodiments described below. These embodiments are merely illustrative examples, and the present disclosure can be implemented in forms with various modifications and improvement based on knowledge of those skilled in the art. Note that components with the same reference signs in the specification and the drawings indicate mutually the same component.

A communication system according to an embodiment includes a terminal described below and an external communication device. Here, the terminal includes communication units, a communication evaluation unit, a surrounding environment information collection unit, a communication prediction unit, a terminal network unit, and a terminal control unit. The communication units can communicate with the external communication device, and the number of the communication units is one or more. The communication evaluation unit evaluates communication quality of the communication units. The surrounding environment information collection unit acquires surrounding environment information through detection performed by a camera or a sensor and from position information of surrounding objects via communication and the like. The communication prediction unit predicts future communication quality using the surrounding environment information. The terminal network unit inputs and outputs such information. The terminal control unit controls physical operations and running of the terminal based on the predicted communication quality. The external communication device according to the present disclosure includes other terminals including a wireless base station and another communication device.

It is possible to include one or more communication units and to use wireless communication such as a wireless LAN defined by IEEE802.11, Wigig, IEEE802.11p, an ITS communication standard, cellular communication such as LTE or 5G, or low power wide area (LPWA), or communication using sound waves, electricity, or light. Hereinafter, the number of the communication units is defined as N. Here, the letter N is a positive number that is equal to or greater than one. Specifically, changes in communication quality due to changes in a surrounding environment occur due to changes in a propagation environment or blocking or opening of electromagnetic waves. Blocking of electromagnetic waves and changes in electromagnetic wave propagation conditions may occur in any structure that can be configured of a metal, such as vehicles, drones, constructions, construction machinery vehicles, and robots, and the influence of blocking of the terminal itself on communication quality is conceivable.

In the present disclosure, surrounding environment information obtained by a camera, a sensor, and a surrounding environment information collection device that collects positions and states of surrounding objects through communication is used, and results learned in advance are used. According to the present disclosure, it is thus possible to appropriately select control, operation, and control rules of the terminal, and thereby to improve a throughput, a delay, continuity, stability, and variations thereof in uplink or downlink communication between the wireless base station and the terminal or in inter-terminal communication between terminals, to avoid degradation of communication quality, and to avoid risky control that may occur due to degradation of communication quality.

FIG. 1 is a block diagram illustrating a configuration example of a communication system according to the first embodiment. The communication system includes a terminal 1 that uses communication and an external communication device 2 capable of communicating with the terminal 1 in a wireless manner.

The terminal 1 includes: a terminal network unit 1-0 that performs inputs and outputs between functional blocks in the terminal 1; a terminal management unit 1-2 that manages terminal information; a terminal control unit 1-5 that controls the terminal 1 based on control information from a communication prediction unit 1-6; a surrounding environment information collection unit 1-3 that collects surrounding environment information of the terminal 1 using a camera, a sensor, or the like; a communication unit 1-4 that communicates with the external communication device 2; a communication evaluation unit 1-1 that evaluates communication of the communication unit 1-4; and the communication prediction unit 1-6 that determines a policy, a plan, and rules related to control of the terminal 1.

The communication unit 1-4 includes communication units 1-4-1 to 1-4-N.

The external communication device 2 includes external communication units 2-1 to 2-N that communicate with the communication units 1-4-1 to 1-4-N of the terminal 1, respectively.

Further, the communication system according to the present disclosure may include a learning unit 1-7 in the terminal 1 or may include a communication evaluation unit 2-1, a learning unit 2-7, or an external operator 2-8 connected to the external communication device 2 via an external network 2-0 as will be described later.

Terminal information managed by the terminal management unit 1-2 is arbitrary information related to the terminal 1 and includes at least one of the position, the speed, the orientation, the posture, the ID, the state, or control of the terminal 1 or a component of the terminal 1. The component of the terminal 1 is, for example, is an antenna included in the communication unit 1-4.

The surrounding environment information collected by the surrounding environment information collection unit 1-3 is arbitrary information from which information regarding a surrounding environment of the terminal 1 can be acquired, and includes, for example, information detected by a visible light camera, an infrared camera, or an arbitrary sensor such as an electromagnetic wave sensor, an optical sensor, or a sound wave sensor or information regarding the positions, the speed, and the state of surrounding objects collected via the communication unit 1-4.

The communication prediction unit 1-6 predicts communication quality based on the surrounding environment information and the terminal information and outputs the communication quality or control information of the terminal 1. The communication prediction unit 1-6 uses a result of learning an input and output relationship in advance through machine learning using the surrounding environment information and the terminal information as input data and the communication quality or the control information as output data. The learning of the input and output relationship is performed by the learning unit 1-7 included in the terminal 1 or the learning unit 2-7 connected to the external NW 2-0. In the learning, reinforcement learning is preferably performed using, as training data, the evaluation result obtained by the communication evaluation unit 1-1 or 2-1. For the reinforcement learning, training data not related to communication, such as control efficiency, an operation time, and power consumption of the terminal 1, may be used in addition to the data output from the communication evaluation unit 1-1 or 2-1. The evaluation result is, for example, prediction precision of communication quality. An arbitrary algorithm is used for the machine learning, and for example, it is possible to perform the learning using a machine learning algorithm such as a support vector machine, a multilayer perceptron, a k-nearest neighbors method, or a random forest or to use deep learning such as a recurrent neural network (RNN), a convolutional neural network (CNN), or a long short term memory (LSTM) or on-line learning.

The communication quality predicted here is communication quality of an arbitrary time later than information of a signal source input to the communication prediction unit 1-6. The arbitrary time is an arbitrary time after a time required by the terminal control unit 1-5 to perform control elapses from acquisition of the surrounding environment information. The output data may be information corresponding to a plurality of timings or information at an arbitrary timing corresponding to a control method that can be selected by the terminal control unit. Alternatively, an occurrence time of an event indicating when a predefined arbitrary event (for example, a communication quality degradation event) will occur may be output.

In a case in which the learning unit 2-7 connected to the external network 2-0 performs the learning, the surrounding environment information and the terminal information for the learning are output to the learning unit 2-7 via the communication unit 1-4-$i$. The letter i is an arbitrary integer that is equal to or greater than one and equal to or less than N. The communication quality may be input to the learning unit 2-7 via the communication unit 1-4-$i$ similarly to the result obtained by the communication evaluation unit 1-1, or communication of the external communication unit 2-4-$i$ may be evaluated by the external communication evaluation unit 2-1, and information related to the communication quality may be input to the learning unit 2-7. Here, the evaluation is arbitrary evaluation through which it is possible to determine a category of an application range of the input and output relationship, prediction precision, or importance of input parameters. The evaluation may be performed at predefined cycles, such as every second, or may be performed in response to a specific event related to the communication quality or a specific event related to the surrounding environment information or the terminal information.

As the learning in response to a specific event related to the communication quality, in a case in which the communication quality largely deviates from that in a steady state or a mode value, the learning is performed using the communication quality as training data and using surrounding environment information and terminal information in the past prior to the situation. As for the specific event related to the surrounding environment information and the terminal information, in a case in which the surrounding environment information and the terminal information satisfy a certain specific condition, learning is performed between the surrounding environment information and the terminal information using, as training data, communication quality information obtained by the communication evaluation unit after a time elapses to some extent. The specific condition of the surrounding environment information corresponds to, for example, a case in which moving of a type of object that affects communication in the surroundings of the communication device has been observed. Examples thereof include passing of a large bus or a truck nearby. The specific terminal information corresponds to, for example, a case in which the position information of the terminal indicates a predefined position (at an intersection, in front of a building, or the like) or a predefined speed.

The machine learning can be performed in an actual environment with the terminal 1 actually performing communication, can be performed using another terminal or data acquired by another terminal specially prepared for the learning, or can be performed in a simulation space that simulates an environment that is as close to an actual environment in the real world as possible. It is also possible to use an input and output relationship learned in the simulation space or by a similar external terminal as transfer learning and to perform the learning both in the simulation and in the actual environment.

In addition, the configuration according to the present disclosure can also be used when the external operator 2-8 controls the terminal 1 via the communication unit 1-4-$i$. At this time, a control command from the external operator 2-8 is input to the communication prediction unit 1-6, and the communication prediction unit 1-6 predicts communication quality achieved by the control command from the surrounding environment information and the terminal information. In a case in which the communication quality does not satisfy a predefined condition at this time, the communication prediction unit 1-6 provides an output indicating that the control is not acceptable to the terminal control unit 1-5. Alternatively, the communication prediction unit 1-6 outputs control information for causing communication quality to satisfy the predefined condition to the terminal control unit 1-5. Then, the terminal control unit 1-5 can discard the control information or follow the alternative control information generated by the communication prediction unit 1-6 or the terminal control unit 1-5.

In a case in which the communication prediction unit 1-6 generates the alternative control information, the control is variable in accordance with the predicted communication quality. The control information generated by the terminal control unit 1-5 is control information that is not affected by the communication quality or is not sensitive to the communication quality. In a case in which there is a condition of controlling acceleration, a speed, or rotation of the terminal or a component of the terminal in accordance with the communication quality, and control that is as close to the control information of the external operator as possible is realized on prediction of communication quality within a range in which the condition is satisfied, for example, the communication prediction unit 1-6 generates the alternative control information.

For example, it is assumed that a maximum speed has been determined in accordance with communication quality. The external operator 2-8 generates a control signal for providing an instruction for acceleration to boost the speed of the terminal, and the terminal obtains the control signal as an input signal. Here, a case in which the fact that, if the communication prediction unit 1-6 directly executes the control signal, future communication quality predicted when the speed of the terminal is accelerated with the control signal with no change does not allow a moving speed in the future obtained with the acceleration may be known. At this time, it is possible to prevent the terminal from being controlled without the condition defined by the communication quality, by the communication prediction unit 1-6 inputting control information providing an instruction for acceleration of the terminal to the terminal control unit 1-5 with the acceleration lowered or the instruction for acceleration deleted.

Further, the terminal control unit 1-5 can notify the external operator 2-8 of a warning signal indicating that control different from that indicated in the control information from the external operator 2-8 has been performed via the communication unit 1-4-$i$. The terminal control unit 1-5 notifies, through the warning signal, the external operator 2-8 or the outside such as an owner of the terminal 1 of the fact that the input control information has been changed and can thus prevent the external operator 2-8 from repeating unnecessary inputs of the control signal and provide the notification as a reference information used by an administrator of the external communication unit 2-4 to consider provision of better communication.

Figure 2:
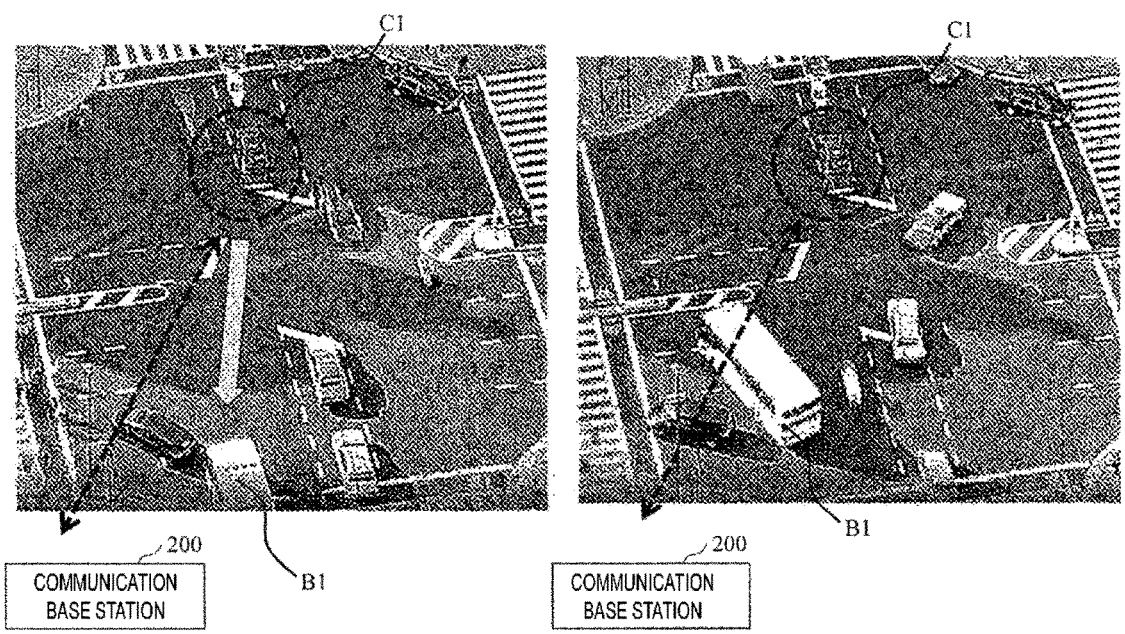
FIG. 2 is a diagram for explaining effects of the communication system according to the present disclosure.

FIG. 2 illustrates a diagram of a case in which communication blocking due to a large vehicle occurs at an intersection. A communication base station 200 functions as the external communication device 2, and the terminal 1 is included in a vehicle C1. The communication base station 200 and the vehicle C1 are performing communication in a wireless manner, and a learning unit has already learned that throughput degradation will occur when a large vehicle is turning left at the intersection. The effect occurs not always because of blocking of a propagation path but also because of changes in complicated propagation state at the intersection. The surrounding environment information collection unit 1-3 acquires the fact that a large vehicle B1 has approached from the front side and has started to turn left, from a video captured by a camera mounted in the vehicle C1. The communication prediction unit 1-6 acquires the position, the speed, and the orientation of the vehicle C1 as terminal information of the terminal itself and predicts that there is a probability that communication quality of the communication unit 1-4 in the terminal 1 will be affected in three seconds or more. The terminal control unit 1-5 performs the following control in response to the result.

The terminal control unit 1-5 changes the position of the antenna included in the communication unit 1-4 or the configuration of a vehicle body C1.

The terminal control unit 1-5 switches setting of the communication unit 1-4 to a control rule (such as a limitation of the maximum speed to 10 km/h) corresponding to low communication quality.

The terminal control unit 1-5 realizes the orientation and the position of the vehicle C1 with which the best communication quality in the prior learning can be achieved, by finely adjusting the stop position of the vehicle C1. In this manner, the control of the terminal control 1-5 also includes control of the vehicle C1 including the terminal 1.

The terminal control unit 1-5 provides a report, warning, or an instruction in regard to degradation of communication quality or a possible problem to the external operator 2-8 that manages the vehicle C1 inside the vehicle C1 or in a remote manner.

Figure 3:
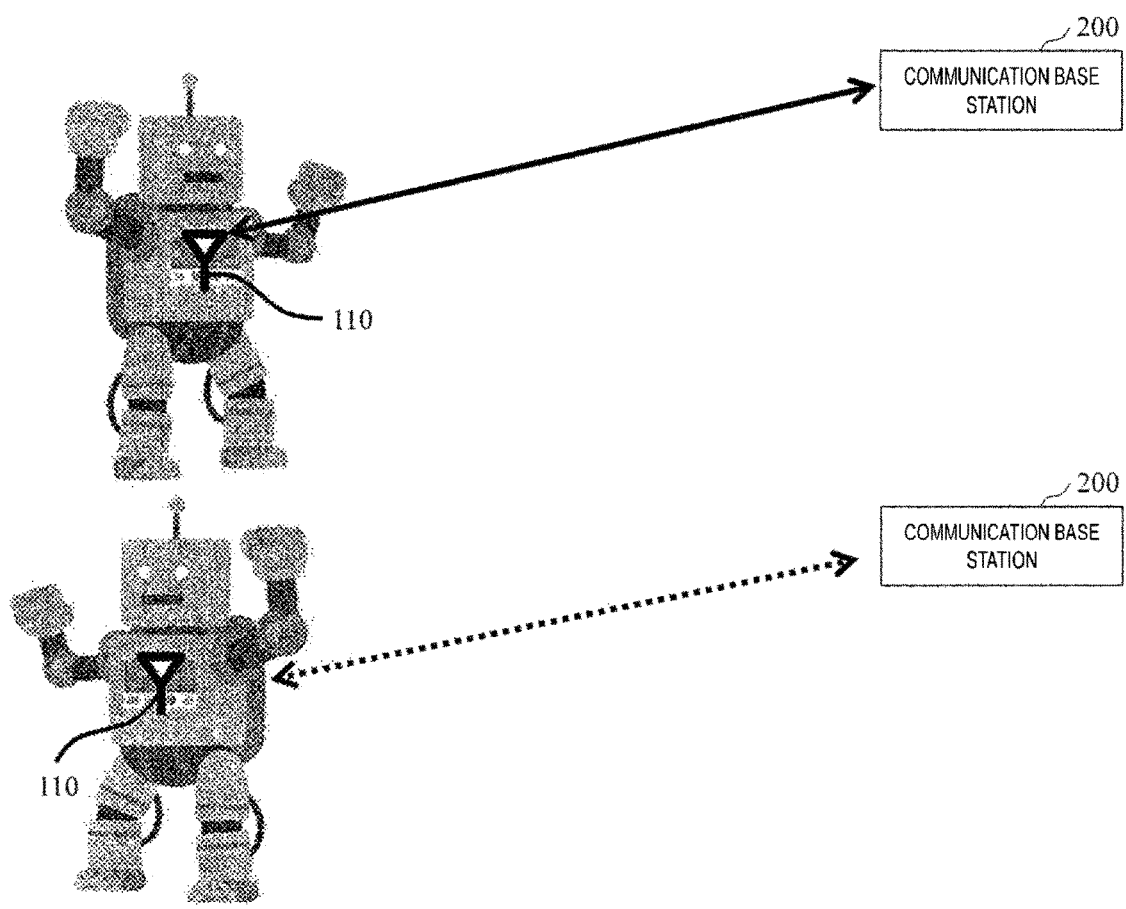
FIG. 3 is a diagram for explaining effects of the communication system according to the present disclosure.

FIG. 3 illustrates a control robot that communicates with a communication base station. The control robot uses, as a belly part, an antenna 110 used for communication. The antenna 110 functions as a component under control of the terminal 1. Although the antenna 110 has high performance for electromagnetic wave radiation and electromagnetic wave reception in the front direction, the antenna 110 has a characteristic that communication quality is degraded if the belly part is hidden by an arm or the back direction faces a communication base station 200. This example is different from that in FIG. 2 in that the terminal itself causes a factor of communication quality degradation regardless of an external environment. Since blocking due to an external structure in FIG. 2 and blocking as a result of itself or an action of itself as in FIG. 3 occur in an actual environment, the terminal 1 according to the present disclosure controls the terminal 1 based on a result of predicting communication quality using surrounding environment information and terminal information.

FIG. 3 illustrates an example in which the back of the control robot faces the communication base station 200 and communication quality is degraded. In order to prevent such a problem, the terminal 1 performs the following operations in this example.

The position and the orientation of the terminal 1 and the control of the component that do not cause degradation of communication quality are learned in advance, and the position and the orientation of the terminal 1 and the control pattern of the component that cause degradation of communication quality are prevented from being employed.

In a case in which the position or the orientation of the terminal 1 or the control of the component that causes degradation of communication quality are employed, the terminal 1 is controlled such that a time during which the state is maintained is minimized to reduce a time during which the influence of the degradation of the communication quality is received.

The control rule is switched to the one corresponding to low communication quality (such as limitation of an operation speed or a limitation of power such as a torque).

The position of the antenna 110 is changed.

An application of the robot using the antenna 110 is switched to one that can be executed at a lower bit rate. In this manner, the control of the terminal control 1-5 also includes control of the robot including the terminal 1.

A report, warning, or an instruction in regard to degradation of communication quality or a possible problem is provided to the operator remotely managing the terminal 1.

The learning unit 1-7 or 2-7 can also perform learning such that the communication prediction unit 1-6 determines only a specific event related to communication quality in order to limit targets of learning and targets of prediction of communication quality. For example, the learning unit 1-7 or 2-7 performs learning such that the communication prediction unit 1-6 predicts a communication quality degradation event that is highly correlated with each or both of the surrounding environment information and the terminal information, and an input and output relationship that detects the communication quality degradation event is output to the communication prediction unit 1-6.

The communication quality degradation event can be defined as a time when predefined criteria of communication quality satisfy a predefined condition. Also, the communication quality degradation event can be defined as an event categorized as degradation of communication quality due to changes in surrounding environment information or terminal information through identification of machine learning. Here, examples of the criteria of communication quality include a bit number per time, a bit number per time and frequency, a packet loss, a packet loss rate, received signal strength indicator (RSSI) degradation, reference signal received quality (RSRQ) degradation, a packet transmission rate, how much these parameters have changed from the steady time, and a feature amount extracted from these plurality of parameters. Examples of the feature amount extracted from the plurality of parameters include a case in which RSSI degradation and degradation of a bit number per unit time have occurred at the same time.

In a case in which the communication prediction unit 1-6 directly determines a control scheme to be employed by the terminal control unit 1-5, the learning unit 1-7 or 2-7 can perform reinforcement learning of the control rules by adding communication quality, stability of the communication quality, and prediction precision of the communication quality as criteria and learn terminal control such that the communication quality maximizes a predefined reward.

The control rules are control rules of the terminal 1 defined for communication quality. The limit rules can limit details of control, such as operations that the terminal 1 can perform, in response to states of communication quality. FIG. 4 illustrates an example of a control table that defines the control rules. The control table defines in advance control rules of the terminal that can be employed for a plurality of states of communication quality. In a case in which the terminal 1 includes the control table, the terminal control unit 1-5 can call a control rule corresponding to predicted communication quality from the control table and control the terminal 1 based on the new control rule.

Here, conditions of communication quality for a throughput and a delay and conditions of control corresponding thereto are illustrated in the table as control rules for a fictitious automatic traveling vehicle. There is description that in a case in which communication quality is significantly poor, the maximum speed has to be 5 km/h and the vehicle has to stop at a road shoulder where the vehicle can stop, and the maximum speed and the traveling area increase as the communication condition is improved. In this manner, it is possible to perform management through communication such that the terminal that automatically operates does not cause an accident or the like, by limiting control in response to communication quality. Moreover, since actual operations of the terminal are less limited and operation efficiency is also enhanced as the communication condition is improved, it is also possible to set the aforementioned reinforcement learning a reward or a value for parameters not related to communication, such as operation efficiency. According to the present disclosure, it is possible to select control rules based on prediction of communication quality and thereby to avoid occurrence of a fatal problem in control in advance.

Control rules that set, for a plurality of states corresponding to communication quality, control parameters of a component of the terminal including at least any of a maximum moving speed of the terminal, a maximum rotation speed of the terminal, a movable route of the terminal, a movable area of the terminal, a route change of the terminal, and an operation range, a maximum operation speed, a maximum rotation speed, and a maximum torque of the component of the terminal are preferably used. Here, setting that allows a higher degree of freedom or larger range as communication quality is higher is preferably used.

Figure 5:
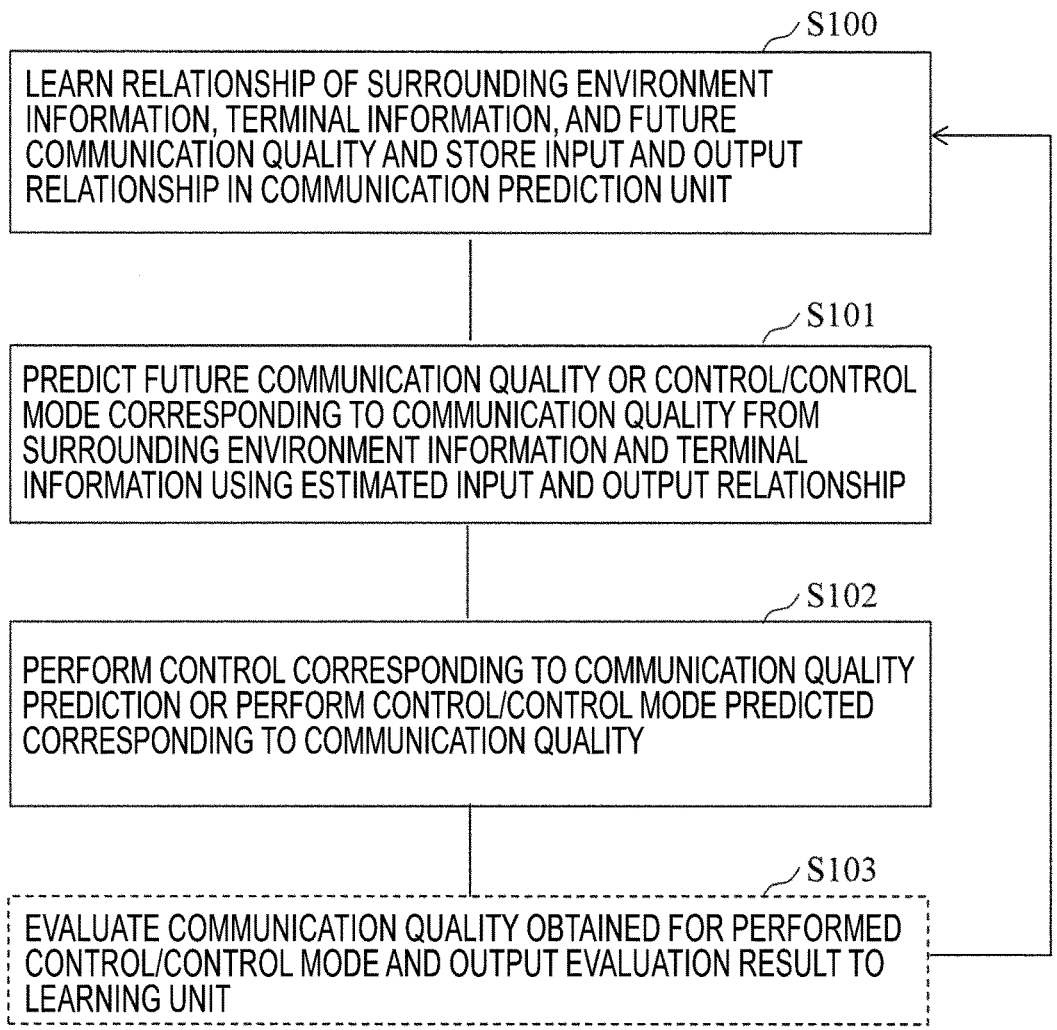
FIG. 5 is a flow diagram illustrating an example of a first communication control method.

FIG. 5 is a flow diagram illustrating a first communication control method according to the present disclosure.

First, the learning unit 1-7 or 2-7 connected to the terminal or the external network 2-0 learns a relationship between a surrounding environment information and terminal information acquired by the terminal 1, by a device other than the terminal 1, or in a simulation space or the like and communication quality or terminal control corresponding to communication quality (S100). Next, the learned input and output relationship is input to the communication prediction unit 1-6, and the communication prediction unit 1-6 outputs future communication quality or setting of control of the terminal 1 corresponding to the communication quality to the terminal control unit 1-5 from the newly input surrounding environment information and terminal information of the terminal 1 (S101).

The terminal control unit 1-5 performs corresponding control of the terminal 1 using an input prediction value of the communication quality, sets a control mode of the terminal 1, or receives the control of the terminal 1 or the control mode of the terminal 1 input from the communication prediction unit 1-6, and performs the control or the control mode (S102).

In a case in which the control or the control mode is input, the terminal control unit 1-5 can determine availability and determine whether to perform the control or the control mode. Further, the terminal control unit 1-5 can evaluate the obtained communication quality for the setting of the performed control or control mode using the communication evaluation unit 1-1 and output the evaluation result to the learning unit 1-7 or 2-7 to use the learning result for future learning (S103).

Examples of control corresponding to communication quality in Step S102 includes control to enhance communication quality, control under a condition that communication quality does not satisfy a predefined condition, and control that provides high prediction probability of communication quality.

Here, the control for enhancing communication quality is, for example, control for causing a vehicle to run along a lane that maximizes communication quality or control for maximizing minimum communication quality in an operation plan in which a robot realizes operations. The control under a condition that communication quality does not satisfy a predefined condition is, for example, control for setting a route such that line disconnection of equal to or greater than 100 ms does not occur at any location while designating a shortest moving route to a destination for a vehicle or a robot.

Moreover, it is possible to exemplify, as control performed in a case in which approaching of a large object such as a truck has been detected as surrounding environment information, changing a lane and moving away from the object to avoid such a positional relationship that leads to degradation of communication quality, performing acceleration to avoid traveling side by side in a specific area, or on the contrary, performing deceleration up to a speed to such extent that no problems occur even if communication quality is degraded. In a case in which performance of predicting communication quality is evaluated, it is possible to exemplify a case in which the communication evaluation unit 1-1 performs posterior determination regarding whether the prediction of the communication quality degradation event, the communication quality improvement event, or a variation width of the communication quality has been reasonable through observation conducted until then. The control or the control rules of the terminal 1 may be determined with reference to the performance of predicting communication quality. It is possible to exemplify selection of a route, a moving range, or a control method that leads to high performance of predicting communication quality in response to surrounding environment information.

Figure 6:
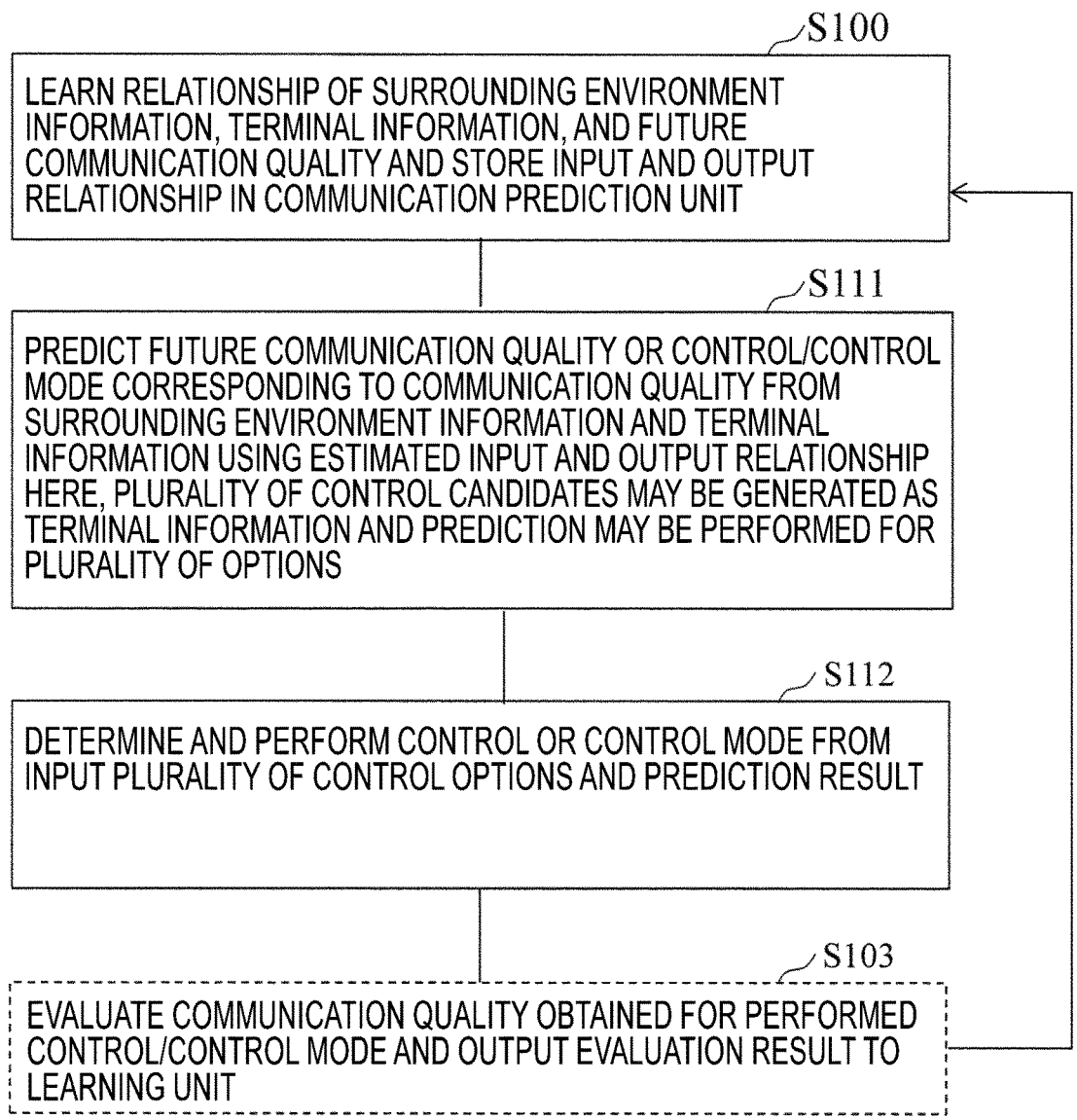
FIG. 6 is a flow diagram illustrating an example of a second communication control method.

FIG. 6 is a flow diagram illustrating a second communication control method according to the present disclosure.

First, the learning unit 1-7 or 2-7 connected to the terminal 1 or the external network 2-0 learns a relationship between surrounding environment information and terminal information acquired by the terminal 1, by a device other than the terminal 1, or in a simulation space or the like and communication quality or terminal control corresponding to the communication quality (S100). Next, the learned input and output relationship is input to the communication prediction unit 1-6, and the communication prediction unit 1-6 predicts future communication quality or setting of control of the terminal corresponding to the communication quality for a plurality of types of control or a plurality of control modes from the newly input surrounding environment information and terminal information of the terminal 1 and outputs the future communication quality or the setting to the terminal control unit 1-5 (S111). It is possible to exemplify, as prediction of control, outputting control that maximizes a predefined target value or reward through reinforcement learning, for example. A plurality of outputs may be done, and parameters related to the control or the control mode and communication quality, efficiency, and the like at that time may be output. The terminal control unit 1-5 determines the control or the control mode of the terminal from a plurality of input prediction results (S112). As a method of determining the control mode, it is possible to determine a control mode that maximizes communication quality or a control mode with highest control efficiency among control modes that satisfy predetermined quality in regard to communication quality, or make determination using reference determined by criteria not related to communication (it is possible to exemplify operation efficiency, power consumption, and the like). In a case in which a plurality of types of control or a plurality of control modes are input, the terminal control unit 1-5 can also determine availability and determine whether to perform the control or the control modes.

Further, the communication evaluation unit 1-1 can evaluate the obtained communication quality for the setting of the performed control or control mode to use the learning result for future learning, output the evaluation result to the learning unit 1-7 or 2-7, and use the evaluation result for the learning in Step S100 (S103).

Figure 7:
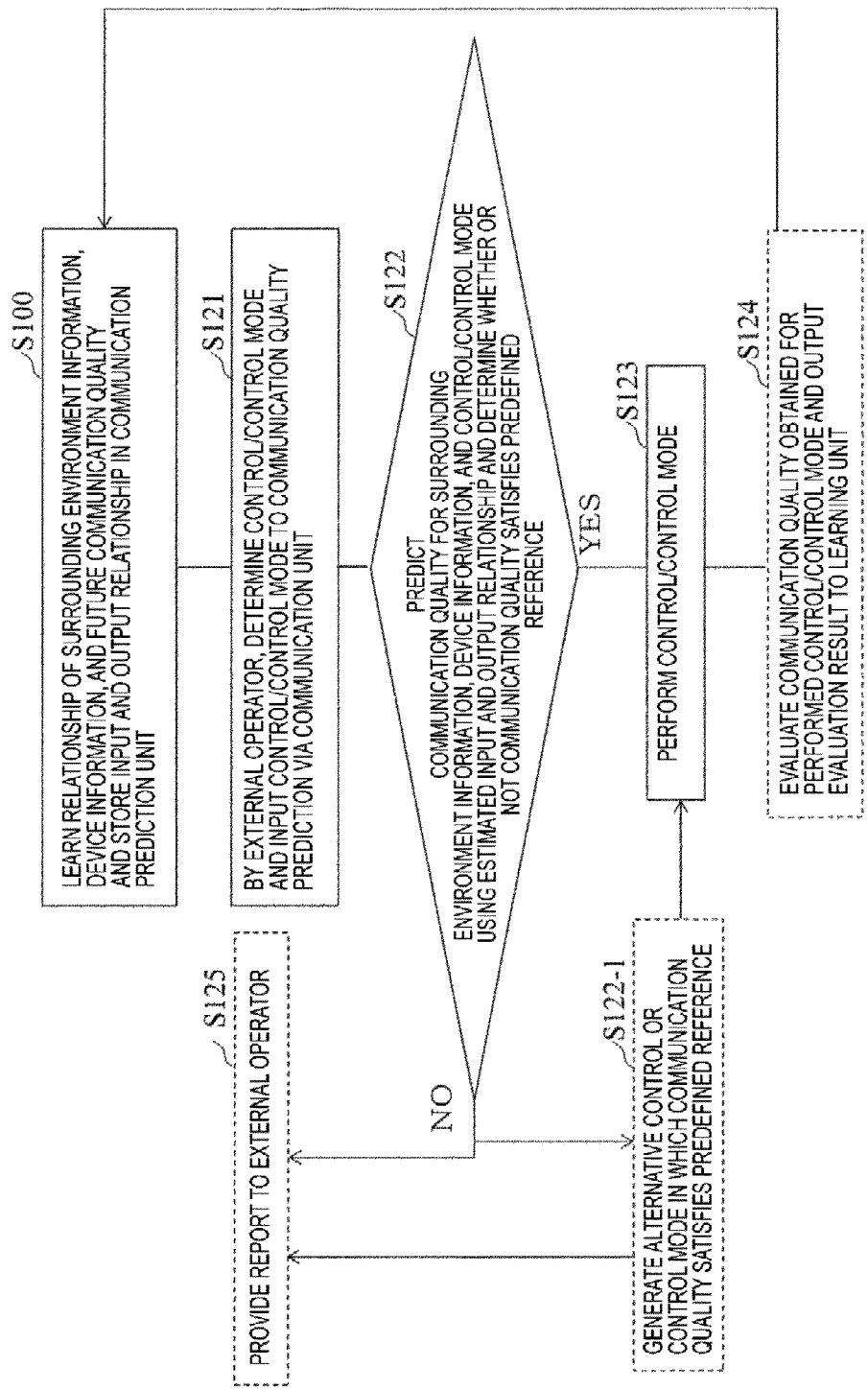
FIG. 7 is a flow diagram illustrating an example of a third communication control method.

FIG. 7 illustrates a third communication control method according to the present disclosure. First, the learning unit 1-7 or 2-7 connected to the terminal 1 or the external network 2-0 learns a relationship between surrounding environment information and terminal information acquired by the terminal 1, by a device other than the terminal 1, or in a simulation space or the like and communication quality or terminal control corresponding to the communication quality (S100). In the communication control method, the external operator 2-8 performs control of the terminal 1, and control information is input to the communication prediction unit 1-6 via communication from the external communication unit 2-4-$i$ to the communication unit 1-4-$i$ (S121). The learned input and output relationship is used by the communication prediction unit 1-6. The communication prediction unit 1-6 predicts future communication quality for the plurality of types of control or the plurality of control modes from the input control information, surrounding environment information, newly input surrounding environment information of the terminal 1, and terminal information and determines whether or not the communication quality satisfies a predefined condition (S122). In a case in which the condition is satisfied (YES), the corresponding control or control mode is performed (S123). In a case in which the condition is not satisfied (NO), it is possible either not to perform control or a control mode at all with no change or to generate alternative control or an alternative control mode that satisfies the predefined condition that has already been defined for communication quality (S122-1) and to perform the control or the control mode (S123).

Further, the communication evaluation unit 1-1 can evaluate the obtained communication quality for the setting of the performed control or control mode to use the learning result for future learning, output the evaluation result to the learning unit 1-7 or 2-7, and use the evaluation result for the learning in Step S100 (S124).

Also, in a case in which the input control or control mode is predicted as not satisfying predefined communication quality in Step S122, it is possible to notify the external operator of the determination result or to provide a notification including the alternative control/control mode generated in Step S122-1 to the external operator.

Figure 8:
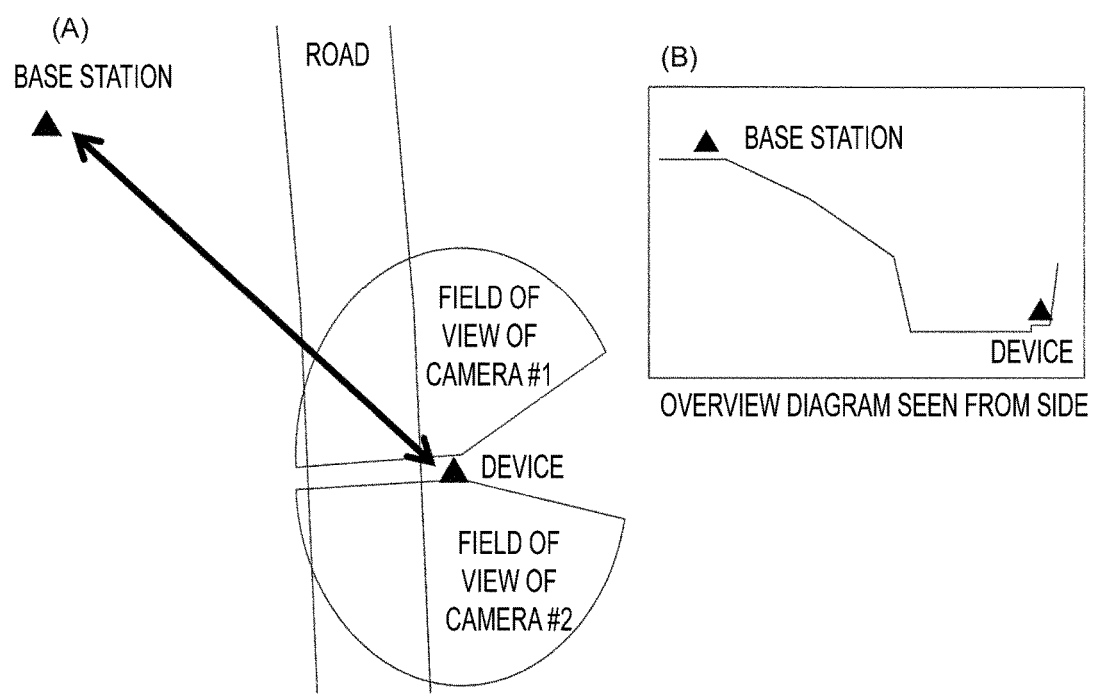
FIG. 8 is a diagram for explaining an experiment conducted in the communication system according to the present disclosure.

FIG. 8 is a diagram of an experiment conducted to confirm the effects of the present disclosure. A wireless LAN base station and a device were installed with a road interposed therebetween, and future communication quality was predicted using videos of two cameras. The device functioned as the terminal 1 while the base station functioned as the external communication device 2. Here, the wireless LAN used a 5 GHz band channel, and a standardization throughput obtained by dividing a throughput per 20 MHz by an average in the past 30 seconds was used as communication quality. The communication quality was evaluated every 1 second. As the cameras, a camera #1 facing upward and a camera #2 facing downward were used.

Figure 9:
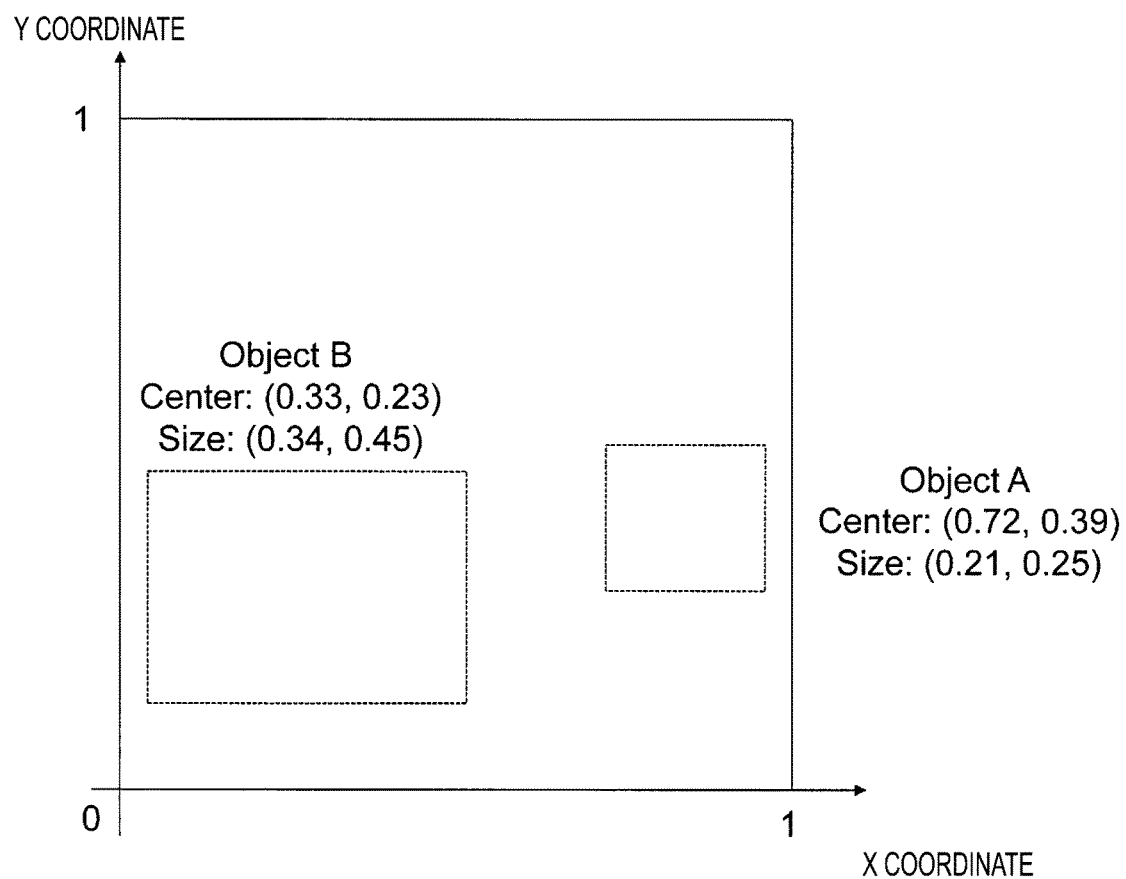
FIG. 9 is a diagram for explaining an experiment conducted in the communication system according to the present disclosure.
Figure 10:
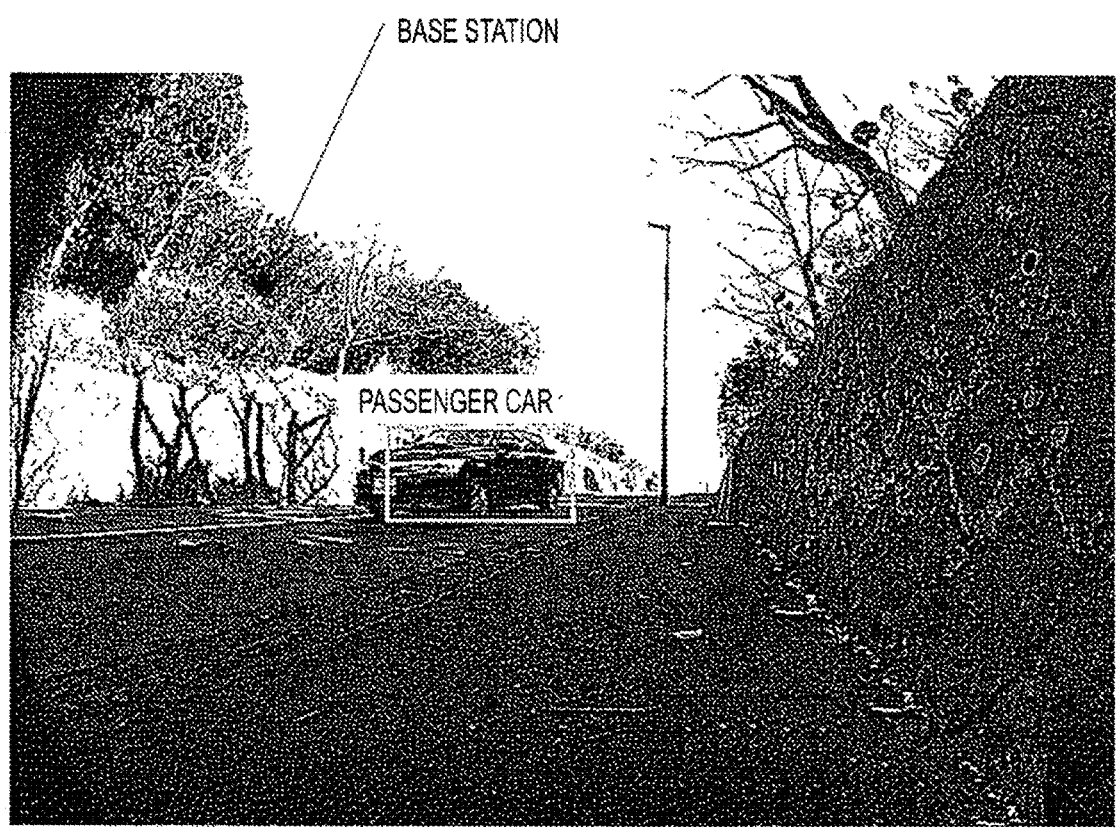
FIG. 10 is a diagram for explaining an experiment conducted in the communication system according to the present disclosure.

Here, the videos from the cameras were acquired at 15 FPS, and the sizes on an X axis, the sizes on the Y axis, and the center positions of objects were extracted. Because fifteen pieces of object information were obtained at a cycle (1 second) of evaluating communication quality, fifteen pieces of position information and fifteen pieces of size information were averaged here, and the amounts of change in size and position with respect to the X axis and the Y axis were extracted as moving speeds. A detection example of sizes and positions of certain objects is illustrated in FIG. 9. A video imaged by the camera #1 in an actual environment and how a vehicle was recognized are illustrated in FIG. 10. Here, the location where the external communication device 2 was present is also illustrated with a star mark for understanding. Although the communication path between the base station and the terminal was not blocked even if a passenger car passed through the surrounding environment, the communication path was blocked in a case in which a bus passed therethrough.

Figure 11:
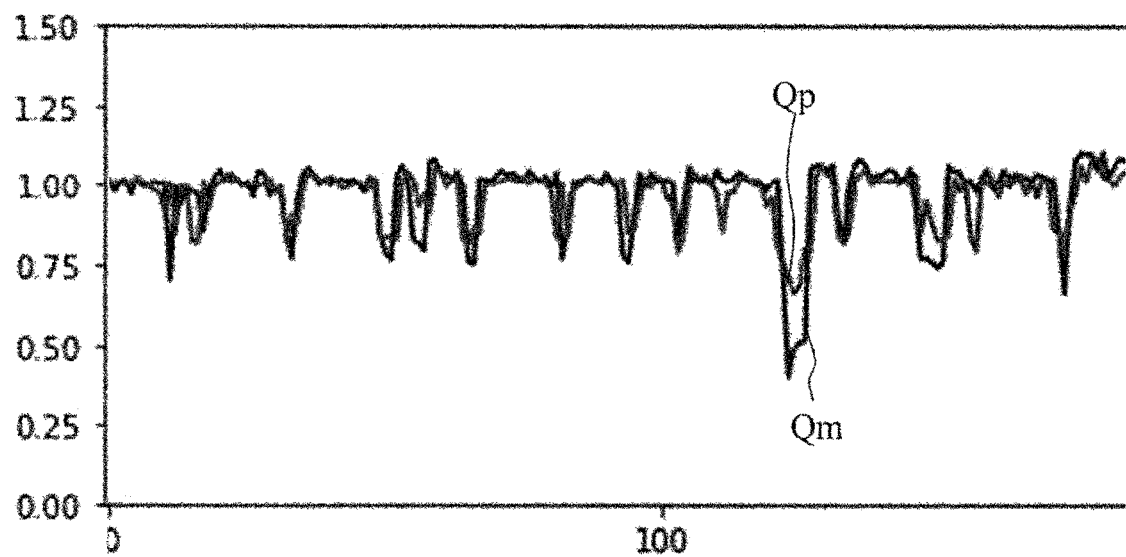
FIG. 11 is a diagram for explaining an experiment result of the communication system according to the present disclosure.

Information regarding cars (passenger cars), buses, and pedestrians acquired from the camera #1 and the camera #2, current communication quality, and a signal power obtained in the current communication were used to predict future communication quality of 1 second later. Here, random forest learning was used to predict communication. FIG. 11 is a diagram illustrating a result of predicting the communication quality of 1 second later. In FIG. 11, predicted communication quality Qp and actually measured communication quality Qm are compared. The graph is obtained by extracting only data during a time in which some objects are recognized in videos imaged by the cameras and 10 second before and after the time and performing learning and prediction. Here, data, corresponding to three hours, of the position of the device is divided into five data set using random forest learning of 500 decision tree, by the k-fold cross validation method, and a result of performing training with four data sets is used to predict communication quality of the one remaining data set. The result represents a result that also includes a case in which only data at timings when cars and buses go back and forth near the device is extracted and there are no influences of passenger cars on communication quality as described above. Focusing on degradation of communication quality, it is possible to confirm that degradation of communication quality was able to be predicted. The results obtained here indicate that a modulation scheme, a coding rate, the number of spatial multiplexings used between the base station and the terminal became inappropriate due to degradation of signal power or variations in channel caused by the Doppler effect of electromagnetic waves received after being reflected by the vehicles, a packet loss occurred, and throughput was degraded.

Figure 12:
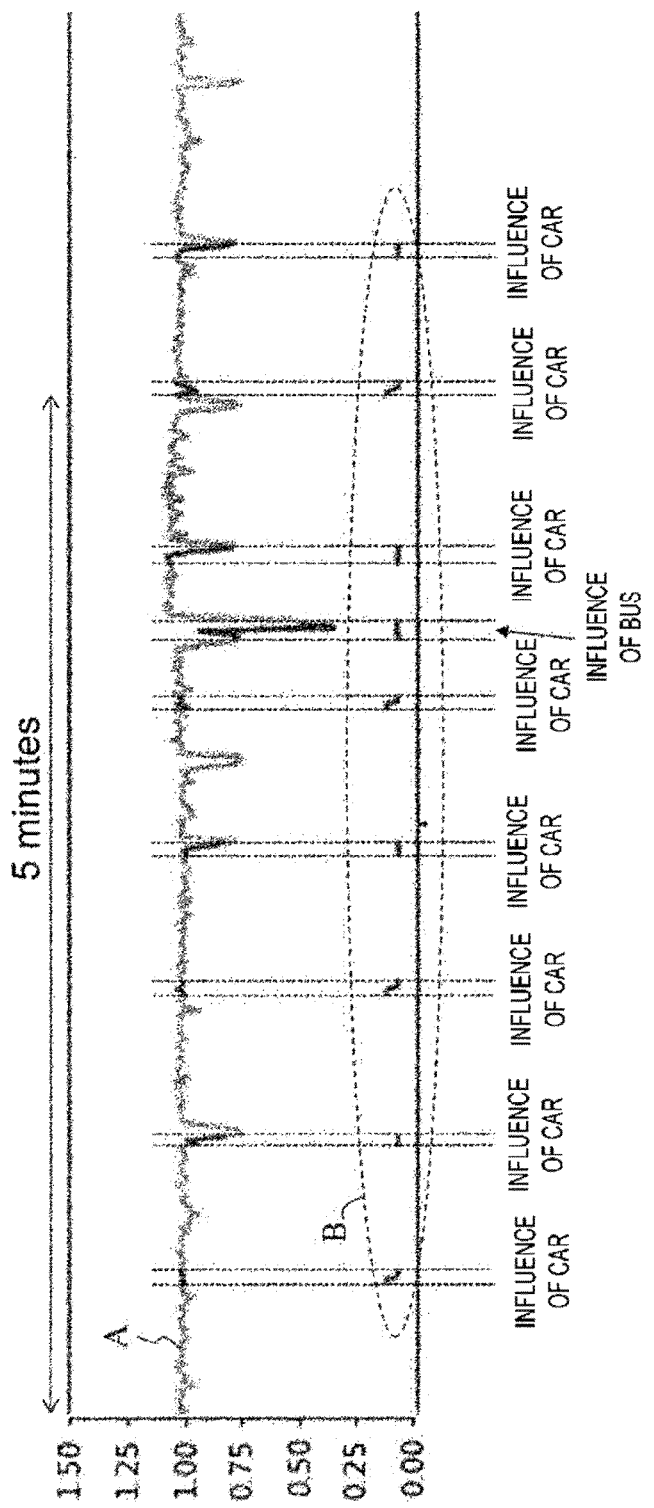
FIG. 12 is a diagram for explaining an experiment result of the communication system according to the present disclosure.

FIG. 12 illustrates correspondence of a standardization throughput and object recognition to time. The line A represents the standardization throughput, and the plot B represents timings at which objects were identified in a video of the camera #1. The objects were recognized at timings plotted near 0.25 below the graph of the throughput. Note that recognition of a car and recognition of a bus are focused here. It is possible to confirm that if a standardization throughput was confirmed at the time, then about a half of throughput degradation occurred under vehicle passing conditions in the case of the car while the throughput was largely degraded in the case of the bus.

Figure 13:
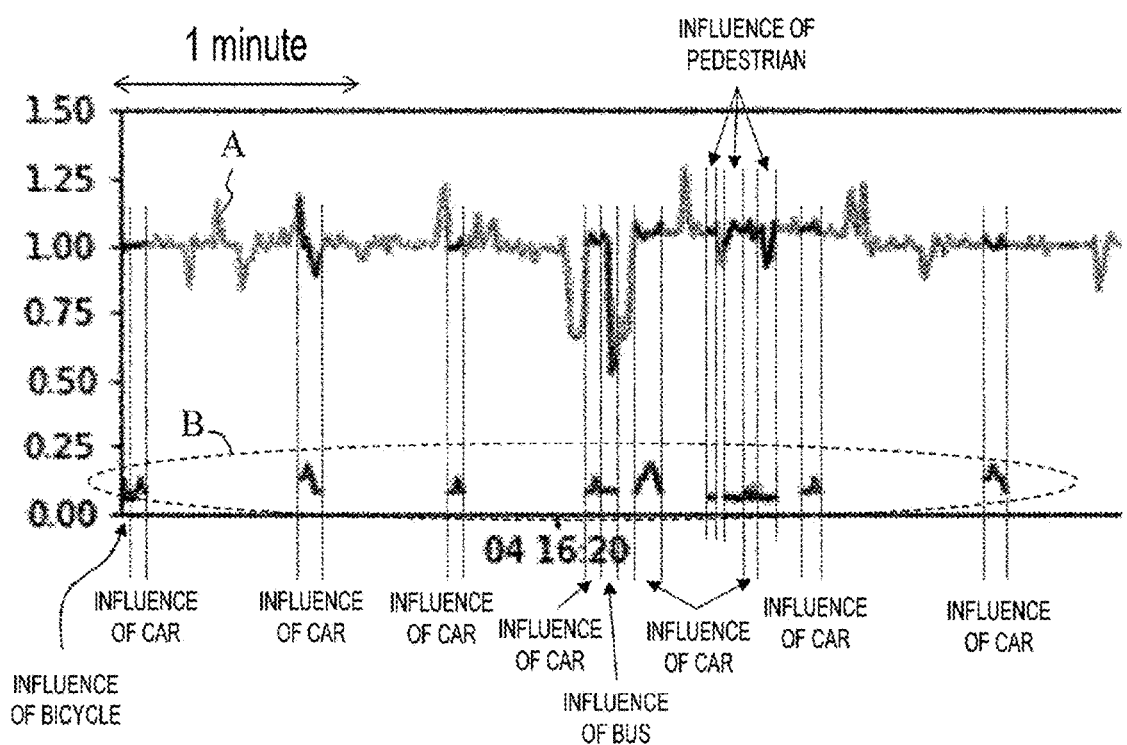
FIG. 13 is a diagram for explaining an experiment result of the communication system according to the present disclosure.

On the other hand, a standardization throughput at a position where the terminal optimized its own position by learning standardization throughput data near this place is illustrated in FIG. 13. The line A represents the standardization throughput, and the plot B represents timings at which objects were identified in a video of the camera #1. According to the plot B, it is possible to confirm that the throughput for the recognition of the car was not degraded although there was a deviation of equal to or less than 20 cm at an absolute position. It is possible to ascertain that optimization of motion of surrounding objects to prevent throughput degradation at a location as described above, for example, can lead to optimization of operations of a robot or various vehicles at this location such that the operations are unlikely to change due to influences of the throughput degradation caused by the surrounding objects.

OTHER EMBODIMENTS

The terminal in the aforementioned embodiments may be realized by a computer. In such a case, the terminal may be realized by recording a program for realizing each of components included in each device in a computer-readable recording medium and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a computer-readable recording medium that stores programs dynamically for a short period of time, one example of which is a communication line used when a program is sent via a communication channel such as a network (e.g., the Internet) and a telephone line, and may also include such a computer-readable recording medium that stores programs for a certain period of time, one example of which is volatile memory inside a computer system that functions as a server or a client in the above-described case. In addition, the program described above may be a program used for realizing some of the components described above, a program that can realize the components described above by being combined with a program that has already been recorded in a computer system, or a program that is realized using hardware such as a programmable logic device (PLD) or a field programmable gate array (FPGA).

The embodiments of the present disclosure have been described above in detail with reference to the drawings. However, specific configurations are not limited to those embodiments and include any design or the like within the scope not departing from the gist of the present disclosure.

Additional Description

An overview of the present disclosure will be summarized as follows.

It is possible to predict future communication quality using surrounding environment information of a device capable of acquiring a camera, a sensor, or the like and terminal information including one or more pieces of information regarding the position information/the orientation/the posture/the ID/the state of the device/control of a component of the device/and control of the device and to perform communication control for better quality that satisfies predefined quality. It is also possible to learn an optimal measure through reinforcement learning using communication quality as an a criterion for options that can be employed by the terminal control unit and to control the terminal based on a strategy learned through the reinforcement learning from an input of the surrounding environment information.

INDUSTRIAL APPLICABILITY

Provided is a terminal that communicates with an external communication device, and in a system that can affect communication quality through control of the terminal, it is possible to acquire information not related to communication that is highly correlated with communication quality from one or both of surrounding environment information and terminal information, and to perform terminal control to improve communication quality or to avoid communication quality that does not satisfy a requirement.

REFERENCE SIGNS LIST

1 Terminal
1-0 Terminal NW unit
1-1 Communication evaluation unit
1-2 Device management unit
1-3 Surrounding environment information collection unit
1-4 Communication unit
1-5 Terminal control unit
1-6 Communication prediction unit
2 External communication device
2-0 External network
2-4-1, 2-4-N External communication unit
110 Antenna
200 Communication base station

The invention claimed is:

1. A terminal that communicates with an external communication device and is connected via a communication network to an external operator that generates control information, comprising: a wireless transceiver configured to communicate with the external communication device; a processor; and a storage medium having computer program instructions stored thereon, when executed by the processor, perform to: generate terminal information including position information of the terminal itself; collect surrounding environment information that is information related to a surrounding environment of the terminal itself; predict communication quality of the wireless transceiver using terminal information and the surrounding environment information by machine learning using an input and output relationship between the surrounding environment information, terminal information, communication quality, and terminal control information learned in advance, and output terminal control information corresponding to the predicted communication quality; and control the terminal itself based on the predicted communication quality and uses the control information as an input signal via the wireless transceiver and, in a case in which the communication quality of the wireless transceiver does not satisfy a condition of communication quality defined for predefined control information, alternative control information with a condition that satisfies the predicted communication quality is newly generated and is input wherein the surrounding environment information includes a camera video captured by a visible light camera or an infrared camera, and outputs control information of the terminal corresponding to the surrounding environment information.

2. The terminal according to claim 1, wherein the computer program instructions further perform to output communication quality of the wireless transceiver through machine learning from the surrounding environment information and the terminal information using an input and output relationship between information including the surrounding environment information and the terminal information and the communication quality of the wireless transceiver, which are learned in advance.

3. The terminal according to claim 2, further comprising:
a control table indicating control rules for the terminal that are able to be employed in advance for a plurality of states of communication quality,
wherein the computer program instructions further calls a control rule corresponding to the predicted communication quality from the control table and controls the terminal based on the newly called control rule.

4. The terminal according to claim 3, wherein, as the control rules, control parameters of a component of the terminal including at least any of a maximum moving speed of the terminal, a maximum rotation speed of the terminal, a movable route of the terminal, a movable area of the terminal, a route change of the terminal, and an operation range, a maximum operation speed, a maximum rotation speed, and a maximum torque of the component of the terminal are set for the states corresponding to the communication quality.

5. The terminal according to claim 1, wherein the computer program instructions further perform to output quality of communication with the external communication device or control information of the terminal corresponding to the communication quality through machine learning from the surrounding environment information and the terminal information using an input and output relationship between information including the surrounding environment information and the terminal information and the communication quality, also between information including the surrounding environment information and the terminal information and a terminal control method, which are learned in advance.

6. A terminal that communicates with an external communication device comprising:
a wireless transceiver configured to communicate with the external communication device;
a processor; and
a storage medium having computer program instructions stored thereon, when executed by the processor, perform to:
generate terminal information including position information of the terminal itself;
collect surrounding environment information that is information related to a surrounding environment of the terminal itself;
predict communication quality of the wireless transceiver using the terminal information and the surrounding environment information; and
control the terminal itself based on the predicted communication quality
output the communication quality of the wireless transceiver through machine learning from the surrounding environment information and the terminal information using an input and output relationship between information including the surrounding environment information and the terminal information and the communication quality of the wireless transceiver, which are learned in advance;
wherein the communication quality of the wireless transceiver is evaluated using an evaluation result of the control of the terminal along with the result included in training data, and
control information for improving the evaluation result of the communication quality through reinforcement learning or for causing the evaluation result to satisfy a predefined condition is output.

7. The terminal according to claim 1 wherein the computer program instructions further perform to
detects a communication quality degradation event due to which degradation of communication quality is predicted, using the surrounding environment information and the terminal information, and
if the communication quality degradation event is input, controls at least any of a motion, a speed, acceleration, an orientation, a position and power consumption of the terminal and a motion, a speed, acceleration, an orientation, and a position of a component under control of the terminal to alleviate communication quality degradation determined by the communication prediction.

8. A communication system comprising:
a terminal; and
an external communication device; wherein the terminal includes
a wireless transceiver configured to communicate with the external communication device;
a processor; and
a storage medium having computer program instructions stored thereon, when executed by the processor, perform to:
generate terminal information including position information of the terminal itself;
collect surrounding environment information that is information related to a surrounding environment of the terminal itself;
predict communication quality of the wireless transceiver using the terminal information and the surrounding environment information by machine learning using an input and output relationship between the surrounding environment information, the terminal information, communication quality, and terminal control information learned in advance, and output terminal control information corresponding to the predicted communication quality of the wireless transceiver; and
control the terminal itself based on the predicted communication quality,
wherein control of the terminal includes detecting a communication quality degradation event using the surrounding environment information and the terminal information, and in response to the communication quality degradation event, controls at least any of a motion, a speed, acceleration, an orientation, a position and power consumption of the terminal and a motion, a speed, acceleration, an orientation, and a position of a component under control of the terminal to alleviate communication quality degradation.

9. The communication system according to claim 8, further comprising:
an external operator that is connected to the terminal via a communication network and generates control information of the terminal,
wherein the computer program instructions uses the control information as an input signal via the wireless transceiver, and
in a case in which the communication quality of the wireless transceiver does not satisfy a condition of communication quality defined for predefined control information, generates a warning signal and outputs the warning signal to the external operator.

10. A communication system comprising:
a terminal; and
an external communication device; wherein the terminal includes
a wireless transceiver configured to communicate with the external communication device;
a processor; and
a storage medium having computer program instructions stored thereon, when executed by the processor, perform to:

generate terminal information including position information of the terminal itself;

collect surrounding environment information that is information related to a surrounding environment of the terminal itself;

predict communication quality of the wireless transceiver using the terminal information and the surrounding environment information; and control the terminal itself based on the predicted communication quality; and an external operator that is connected to the terminal via a communication network and generates control information of the terminal, wherein the computer program instructions uses the control information as an input signal via the wireless transceiver, and in a case in which the communication quality of the wireless transceiver does not satisfy a condition of communication quality defined for predefined control information, alternative control information with a condition that satisfies the predicted communication quality is newly generated and is input.

* * * * *